United States Patent Office 3,116,383
Patented Dec. 31, 1963

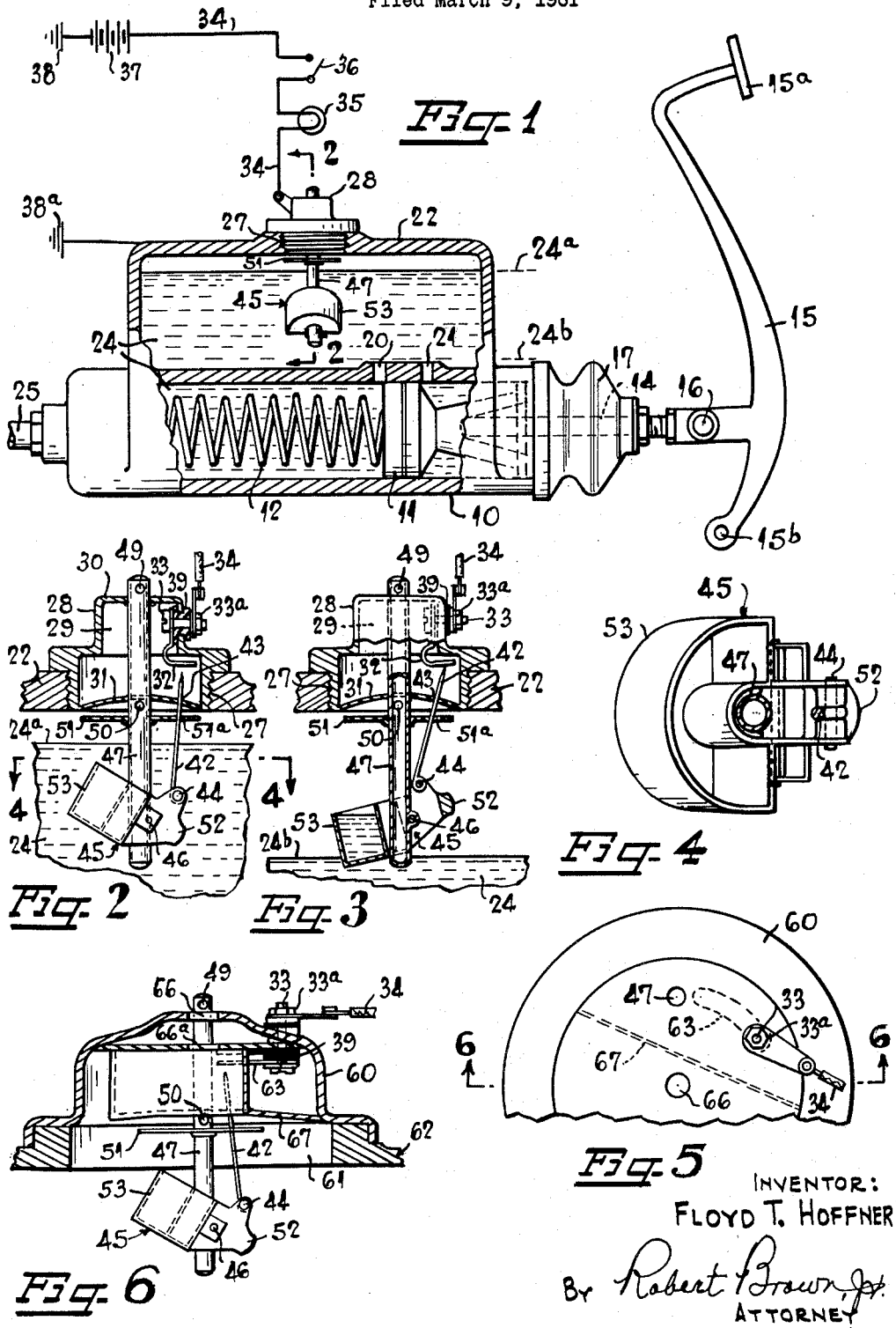

3,116,383
HYDRAULIC BRAKE FAILURE WARNING DEVICES
Floyd T. Hoffner, Rte. 7, Box 403, Salisbury, N.C.
Filed Mar. 9, 1961, Ser. No. 94,504
11 Claims. (Cl. 200—84)

This invention relates to a device for signalling a predetermined low liquid level in reservoirs of hydraulically operated devices and more particularly to the combination of such a device with a hydraulic master cylinder for automotive brakes.

When the brake fluid in the reservoir of a master cylinder falls to the bottom of the reservoir, air will be drawn into the cylinder to replace space previously filled by liquid brake fluid. Subsequently, when the brake pedal is depressed, this air will compress into a smaller volume rather than transmit the applied braking force to the brake drums. Hence the braking system will be impaired or rendered totally ineffective. Moreover, the driver being unaware of the dangerously low level of brake fluid, will not have presence of mind or sufficient time to take precautionary measures such as pumping the brake pedal or applying the hand brakes. Even these measures will not stop the vehicle as quickly as normally operating brakes.

It is therefore an object of this invention to provide a signalling device wherein means are employed for warning the driver when the brake fluid is approaching a dangerously low level in the reservoir of the master brake cylinder. The present device is designed to warn the driver at a time sufficiently in advance of complete brake failure so as to enable him to either make the necessary repairs or to safely drive a short distance to a repair shop.

It is another object of this invention to provide an apparatus of the class described wherein the excess weight of a body in air over its weight submerged in liquid brake fluid is employed to control or actuate a signalling element. In the present embodiment, the body is illustrated as a cup or open-top container together with its liquid contents. The weight of the submerged cup, less the liquid therein, will exert slightly less downward pull than that required to actuate or control the signalling element since the weight of the liquid in the submerged cup exerts no downward pull. When, however, the liquid falls below the cup, the liquid in the cup will exert a downward pull because it is surrounded by air, and this pull will supply the necessary actuating force. Hence, the difference between the submerged weight of the body and its weight in air controls the actuation of the signalling element.

It is a further object of this invention to provide an electrically operated signalling apparatus of the class described wherein the above-mentioned excess weight controls the operation of a switch in such a manner that one of the switch contacts will slide relative to and against the other after the switch has been initially closed, thereby removing foreign matter which might prevent proper electrical contact.

It is important to note that the switch contacts or poles are located above the liquid level and cannot be submerged in the brake fluid. Where two such contacts are submerged in brake fluid, and permitted to remain spaced apart, a small amount of current will travel from one contact or pole to the other since the fluid will conduct the current, and therefore corrosion will be deposited through electrolytic action upon one of the poles. While a certain amount of oxidation and other foreign matter may adhere to the contacts over a period of time in the present device, electrolytic deposition will not take place.

Some of the objects of the invention having been stated, other objects will appear as the description proceeds when taken in connection with the accompanying drawings, in which—

FIGURE 1 is an elevational view, with portions thereof in section, showing my improved signalling apparatus installed on one type of reservoir of a master brake cylinder;

FIGURE 2 is an enlarged vertical sectional view taken along line 2—2 in FIGURE 1, showing the position occupied by certain parts of the signalling apparatus when the liquid brake fluid is at a safe operating level;

FIGURE 3 is an enlarged sectional view similar to FIGURE 2, but showing the position occupied by the parts when the brake fluid has fallen to a predetermined low level at which a signalling element is actuated;

FIGURE 4 is a sectional detail plan view taken along line 4—4 in FIGURE 2;

FIGURE 5 is a top plan view showing a portion of another type of hydraulic reservoir cover and upon which the present invention has been mounted, and FIGURE 6 is a vertical sectional detail view taken along line 6—6 in FIGURE 5.

Referring more specifically to the drawings, the numeral 10 denotes a master cylinder of a hydraulic brake system, said cylinder having a piston 11 therein and mounted for longitudinal reciprocation. A spring 12 yieldably urges piston 11 to the right in FIGURE 1, whereas the movement of the piston to the left is effected by piston rod 14, foot lever 15 and foot pedal 15a.

One end of piston rod 14 engages piston 11 and its other end is pivotally secured to foot lever 15 as at 16. A protective dust seal 17, made of rubber or other suitable flexible material, is mounted around rod 14 between the end of the master cylinder and the foot lever.

Master cylinder 10 is provided with spaced ports 20 and 21 in the upper portion thereof, which ports establish communication between the interior of the master cylinder and the interior of a reservoir 22 formed integrally with and above the cylinder. The respective interior spaces of master cylinder 10 and reservoir 22 are adapted to hold a liquid brake fluid 24. This fluid should be maintained at a safe operating level such as indicated at 24a in FIGURE 1.

In normal operation of the brakes, the driver exerts foot pressure upon pedal 15a thereby rotating lever 15 about its pivot 15b to cause the piston rod 14 and piston 11 to move to the left in FIGURE 1 and compress spring 12. Thus the piston 11 will force a liquid column from within the master cylinder and outwardly through conduit 25. Air is drawn into the master cylinder reservoir 22 through vent openings 49, 50 to replace the fluid drawn from the reservoir. When the brake fluid falls to the level 24b, at the top of port 21, normal operation of the brakes draws air instead of brake liquid into the master cylinder 10 to thereby impair, or render totally ineffective, the hydraulic braking apparatus.

The above-described conventional mechanism is representative of one type of hydraulic master brake cylinder with which the invention hereinafter described is adapted to operate.

The top of reservoir 22 has a vertical bore 27 therein in which a metallic filler plug 28 is threadably secured, the interior of said plug being provided with a vertical cavity 29 which is closed at its top and bottom by horizontally extending plate portions 30 and 31 respectively. The upper end of a leaf spring electrical contact 32 is secured to the vertical wall of cavity 29 by means of a bolt 33 which in turn, extends laterally through the wall and its projecting end has one end of a wire conductor 34 secured thereto by means of a nut 33a. Leaf spring contact 32 and wire conductor 34 are insulated from plug 28 by a suitable non-porous insulating material 39. A signalling element 35, ignition switch 36, battery 37 and ground 38 are serially connected by conductor 34 in the order named.

The lower free end of spring contact 32 cooperates with the upper end of a contact rod 42 to provide a normally open switch. The intermediate portion of rod 42 penetrates plate portion 31 as at point 43 to slidably confine rod 42 for movement substantially through this point while the extreme upper and lower ends of the rod move vertically and laterally. The lower end of rod 42 is pivotally secured as at 44 to one end of a horizontally disposed liquid level responsive member 45, said member being pivoted intermediate its ends as at 46 to the lower portion of a vertically disposed hollow tube 47.

When member 45 rotates counterclockwise about pivot 46 in response to the fall of brake liquid from level 24a to 24b, as hereinafter more fully explained, rod 42 will be moved from its lowered position as shown in FIGURE 2 to the elevated position as shown in FIGURE 3 to close the switch. The unique type of knee action between the cup 53 and contact switch 32, 42, serves to furnish adequate power for operating the switch so that the contacts will slidably engage one another to provide a self-cleaning action, and to establish firm ground contact at point 43.

The upper end of tube 47 penetrates horizontal plate portions 30 and 31 of filler plug 28 and is secured in position by suitable means such as soldering or welding. Both ends of tube 47 are closed. In order to vent the reservoir, the hole 49 is provided at the upper projecting end of tube 47 and two holes 50 are provided at the intermediate portion of the tube immediately below plate portion 31. A horizontal disk or baffle plate 51 is secured around tube 47 and below holes 50 so as to shield these holes from the splash of brake fluid. The plate 51 is provided with a slot 51a to permit passage and operation of the intermediate portion of rod 42.

It will be observed from FIGURES 2 and 3 that the right-hand end of liquid level responsive member 45 is provided with a weight 52 adjacent the lower end of rod 42, while the opposite end of member 45 has an open-top cup or container 53 formed integrally therewith. Cup 53 is of unique design in that it partially encircles tube 47 (FIGURE 4); and the outer dimensions of member 45 including the cup is such that it may be inserted or withdrawn through an opening of minimum size, namely, opening 27.

The weight of the right-hand end of member 45 (FIGURES 2 and 3) including the weight of rod 42 is slightly greater than the weight of the cup 53 when it is submerged and filled with brake liquid 24. The upper end of rod 42 will therefore be pulled downwardly out of contact with spring contact 32 when member 45 is submerged. When the cup is submerged the fluid in the cup obviously exerts no downward pull, but when the liquid level drops below the cup the liquid therein will become effective and the downward pull will be substantially the weight of the fluid in the cup.

The brake liquid around the submerged assembly serves both as a lubricant and as a vibration insulator during normal operation of the vehicle. Vibration insulation is especially important to a signalling device of this type inasmuch as the required precision cannot be attained over a long period of time without it. The car vibrations and movements are normally of such magnitude that an unsubmerged liquid responsive member such as the conventional float would soon wear and become unsuitable, whereas a submerged liquid responsive member is stabilized by the surrounding liquid.

When the brake fluid 24 drops to lever 24b, the weight of the liquid in the cup 53 will rotate member 45 in a counterclockwise manner from the position shown in FIGURE 2 to that shown in FIGURE 3. During this rotation the pivot 44 will rotate upwardly and to the left about pivot 46, thereby moving the upper end of rod 42 into engagement with the free end of spring contact 32. Since the vertical movement of rod 42 is slidably confined through point 43, the upper end of rod 42 will engage contact 32 and deflect it upwardly and also slide laterally to the right to the position shown in FIGURE 3. This sliding contact will remove oxidation or other foreign matter and provide an effective electrical connection. It will be noted that contact 32 is a cantilevered leaf spring and that contact 42 slides against this spring in a direction toward the free end of the latter as the switch is closed, thereby obtaining a progressively decreasing pressure between the contacts during closing of the switch. Self-cleaning switches are essential to dependable operation of the present device where the occasions for giving warning signals are often separated by long time intervals during which foreign deposits may accumulate upon the contacts.

The knee action between the points 32 and 46 slides and simultaneously rotates the grounding contact rod about guide hole 43 so that the above-mentioned self-cleaning action will be performed. The knee action also presses grounding contact rod firmly into engagement against plate 31 at guide hole 43, carrying all current to its ground at the cap rather grounding it through the brake fluid and causing electrolytic action.

Briefly stated the above-described parts operate to effect a dual self-cleaning action. The first self-cleaning action occurs between switch contacts 32 and 42 to insure a good electrical connection. The rise of the brake fluid level causes the grounding rod, of which contact 42 is a part, to first exert pressure contact upon spring contact 32 and to deflect the latter; then to rub across the spring surface while maintaining this pressure contact. The fall of the brake fluid level will, of course, reverse the direction of relative movement between the engaging contacts 32 and 42. This pressured back and forth sliding engagement is repeated many times by the rise and fall of the fluid level as the latter approaches the predetermined low danger point and while the vehicle is operated. The second self-cleaning action occurs between the intermediate portion of contact rod 42 and plate 31 to insure a good electrical path to the ground without passing through the brake fluid. The above-described movement and pressure between contacts 32 and 42, in connection with the first self-cleaning action, causes the intermediate portion of contact rod 42 to slide longitudinally through and to be pressed laterally against the wall of hole 43 in plate 31, thereby scraping and cleaning the engaging surfaces to insure a metal to metal contact with plate 31, said plate serving both as an electrical ground element and as a shield for protecting contacts 32 and 42 from the brake fluid. The above construction eliminates all possibility of non-conductive corrosion, such as oxides and sulfides, from accumulating between the intermediate portion of contact rod 42 and plate 31 as the brake fluid approaches the predetermined low danger level. Such an accumulation, if not removed, would impair the effectiveness of the connection between members 31 and 42 by shunting current through the brake fluid.

The engagement between contacts 32 and 42 as previously described establishes an electrical circuit wherein current will flow from battery 37, through conductor 34, switch 36, signalling element such as a light or buzzer 35, contact rod 42, point 43, member 31, cap 28, reservoir housing 22 and ground 38a. Thus the signalling element 35 will operate to warn the driver of impending brake failure.

By making tube 47 of the required length, the cup 53 may be supported at various levels so as to conform with the level at which signals are desired. Once a warning signal has been given due to a low liquid level of brake fluid, the signal will continue until the fluid is replenished or the ignition switch 36 is opened.

FIGURES 5 and 6 show the present invention adapted to a different form of cover 60, said cover fitting over opening 61 in reservoir 62. Cover 60 being of a relatively large diameter, a flat leaf spring contact 63 may be employed rather than the shape of contact 32 in the preceding form. One end of contact 63 is secured to the top of the interior of the cover by means of previously described bolt 33 and insulation 39. Cover 60 is also provided with centrally disposed holes 66 and 66a which are adapted to accommodate a suitable fastening means (not shown) by which the cover is held in position. As in the preceding form of invention, contacts 42, 63 cannot be submerged due to their elevated positions. Partition 67 protects contacts 42, 63 from the splash of brake fluid. The remaining parts of this form of invention are substantially identical to those described in connection with the preceding form.

It is evident that the previously described body comprising cup 53 and the liquid 24 therein, may consist entirely of a solid material provided its effective weight when submerged is less than that required to initiate the operation of the signalling element, and further provided, the weight of this body in air is sufficient to initiate said operation.

The principal features and advantages of the invention are summed up in the following paragraphs:

(a) The electrical contact switch 32, 42 is located within the cover or plug 28, 60 above the reservoir and cannot be submerged in brake fluid in normal use. This prevents electrolysis in the brake fluid and the deposit of corrosion on contacts 32, 42 or 42, 63.

(b) As the cup 53 filled with liquid falls downwardly, the knee action or leverage between pivot 46 and contact 32 increases or multiplies the electrical contact pressure so as to provide a good connection regardless of the infrequency of operation of the device.

(c) A unique manner of grounding at contacts 32, 42 is accomplished by rubbing action which provides self-cleaning of the switch upon each operation.

(d) The cup 53 may be elevated or lowered in the reservoir by turning screw plug 28, or to a greater degree by varying the length of tube 47, thereby varying the time at which the warning signal is to be given.

(e) All of the submerged parts of this assembly are at ground potential, resulting in no corrosion buildup from electrolysis in the brake fluid.

(f) With the cup 53 submerged, it is well lubricated at all times. The brake fluid also serves as a vibration insulator which increases the efficiency and effective life of the device.

(g) A very little fluid spills out of cup 53 when it is down, thereby momentarily giving the cup a little buoyancy.

Other advantages and features are stated with more detail in the foregoing specification.

In the drawing and specification, preferred embodiments of the invention have been disclosed, and although specific terms are employed, they are used in a generic sense and not intended for purpose of limitation, the scope of the invention being set forth in the following claims.

I claim:

1. In combination with a master cylinder for hydraulic brakes, said cylinder having a chamber for holding a supply of liquid brake fluid, a device for signalling a predetermined low level of liquid in said chamber comprising, a liquid level responsive member oscillatably mounted intermediate its ends on a substantially horizontal axis within the chamber and above said low level, said member having an open-top container at one end thereof, an elongated vertically disposed electrical contact bar having its lower end pivotally secured to the opposite end of said member, a second electrical contact bar arranged transversely of the longitudinal axis of and engageable by the upper end of said first bar to form a closed switch when the last-named bar is in its uppermost position, spring means for yieldably urging said bars one toward the other when the switch is in closed position, means located intermediate said second bar and the lower pivoted end of the first bar for slidably supporting the latter bar for movement substantially through a fixed point whereby oscillatory motion of said member will simultaneously oscillate and longitudinally slide said first bar relative to said fixed point to close said switch and produce sliding engagement between the switch contacts, an electrical circuit controlled by said switch, and a signalling element in said circuit, the apparent weight at the container end being normally less than the apparent weight at the opposite end of said member when submerged, the apparent weight at said container end including the weight of the liquid retained in the latter being greater than said apparent opposing weight when not submerged, whereby when said member is substantially submerged said vertically disposed contact bar will move to its lowermost position to open the switch, and whereby when the liquid falls to a predetermined level the latter contact bar will be moved into engagement with transverse bar to close the switch.

2. In combination with a master cylinder for hydraulic brakes, said cylinder having a chamber for holding a supply of liquid brake fluid, a device for signalling a predetermined low level of liquid in said chamber comprising, a liquid level responsive member oscillatably mounted intermediate its ends on a substantially horizontal axis within the chamber and above said low level, said member having an open-top container at one end thereof, a vertically disposed electrical contact bar having its lower end pivotally secured to the opposite end of said member, a second electrical contact bar engageable by said first bar to provide a closed switch when the latter bar is in its uppermost position, an electrical circuit controlled by said switch, and a signalling element in said circuit, the apparent weight at the container end being less than the apparent opposing weight at the opposite end of said member when submerged, the apparent weight at said container end including the weight of the liquid retained in the latter being greater than said apparent opposing weight when not submerged, whereby when said member is substantially submerged in the liquid said vertically disposed contact bar will move to its lowermost position to open the switch, and whereby when the liquid falls to a predetermined level the last-named bar will be moved upwardly into engagement with said second bar to close the switch.

3. A signalling device as defined in claim 2 and further comprising, means for imparting relative sliding engagement between said contact bars during the opening and closing of said switch.

4. In combination with a master cylinder for hydraulic brakes, said cylinder having a chamber for holding a supply of liquid brake fluid, a device for signalling a predetermined low level of liquid in said chamber comprising, a liquid level responsive member oscillatably mounted intermediate its ends on a substantially horizontal axis within the chamber and above said low level, said member having an open-top container at one end thereof and an electrical contact at the opposite end, a second electrical contact engageable by said first contact when the latter is rotated by said member to uppermost position to establish a closed switch, an electrical circuit controlled by said switch, and a signalling element in said circuit, the weight at the container end being less than the opposing weight at the contact end of said member, whereby when said member is substantially submerged said contact end will move to its lowermost position to open said switch, and whereby when the liquid falls to a predetermined low level the liquid retained in said container and the increased weight of the container will move said first contact into engagement with the second contact to close the switch.

5. A signalling device as defined in claim 4 and further comprising, means for imparting relative sliding engagement between said contacts during the closing and opening of said switch.

6. In combination with a reservoir for hydraulically operated apparatus, said reservoir adapted to hold a supply of liquid operating fluid, a device for signalling a predetermined low level of liquid in said reservoir comprising, a liquid level responsive member oscillatably mounted intermediate its ends on substantially a horizontal axis and above said low level, said member having an open-top container at one end thereof, the weight at said container end being less than the opposing weight at the opposite end of said member when submerged, whereby when said member is substantially submerged said opposite end will fall to a lowered position, and whereby when the liquid falls to a predetermined low level the liquid retained in the container and the increased weight of the container will rotate said opposite end to an uppermost position, a signalling element, and means controlled by the upward movement of said opposite end for actuating said element.

7. In combination with a reservoir for hydraulically operated apparatus, said reservoir adapted to hold a supply of liquid operating fluid, a device for signalling a predetermined low level of liquid in said reservoir comprising, a liquid level responsive member oscillatably mounted intermediate its ends on a substantially horizontal axis and above said low level, liquid retention means carried by one end of said member and adapted to normally receive liquid from said reservoir when submerged, the weight of the liquid retention end being less than the opposing weight at the opposite end of said member when submerged, whereby when said member is substantially submerged said opposite end will fall to a lowered position, and whereby when the liquid falls to a predetermined low level and below the retention means, the liquid retained in the latter will rotate said opposite end to an elevated position, a signalling element, and means controlled by the upward movement of said opposite end for actuating said element.

8. A signalling device as defined in claim 6 wherein said last-named means includes an electrical circuit, a switch in said circuit, and connecting means between said switch and said opposite end.

9. A signalling device as defined in claim 7 wherein said last-named means includes an electrical circuit, a switch in said circuit, and connecting means between said switch and said opposite end.

10. A signalling device as defined in claim 9 and further comprising, means for imparting relative sliding engagement between the contacts of said switch during the closing and opening of the latter.

11. In combination with a master cylinder for hydraulic brakes, said cylinder having a chamber for holding a supply of liquid brake fluid, a device for signalling a predetermined low level of liquid in said chamber comprising, a liquid level responsive body mounted above said low level and being normally submerged, a signalling element, an electrical circuit, a switch in said circuit including a cantilevered leaf spring contact and means including a second contact slidably engageable with and transversely toward the free end of said spring during the closing of the switch whereby progressively decreasing pressure will be exerted between said contacts and means controlled by the excess weight of said body in air over its weight submerged in said liquid for actuating said second contact.

References Cited in the file of this patent
UNITED STATES PATENTS

| | | |
|---|---|---|
| 1,096,470 | Stern | May 12, 1914 |
| 1,338,987 | Kettering | May 4, 1920 |
| 1,573,674 | Burnham | Feb. 16, 1926 |
| 1,704,761 | Plant | Mar. 12, 1929 |
| 2,616,004 | Richards | Oct. 28, 1952 |
| 2,661,410 | Luczko | Dec. 1, 1953 |